No. 873,240. PATENTED DEC. 10, 1907.
E. A. HYDE.
GAITING DEVICE FOR HORSES.
APPLICATION FILED JAN. 22, 1907.
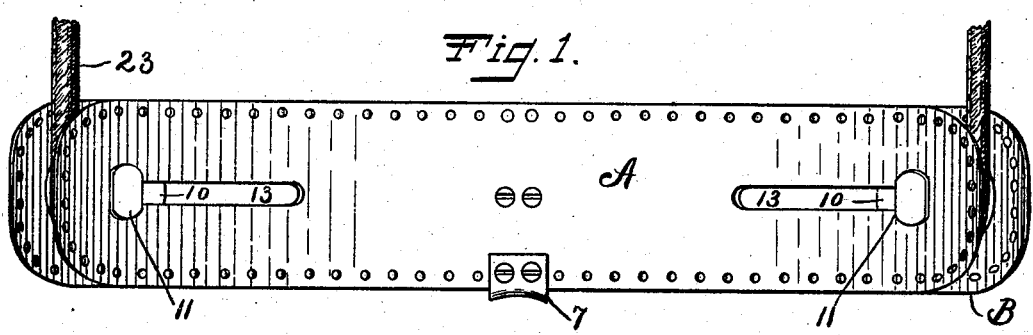
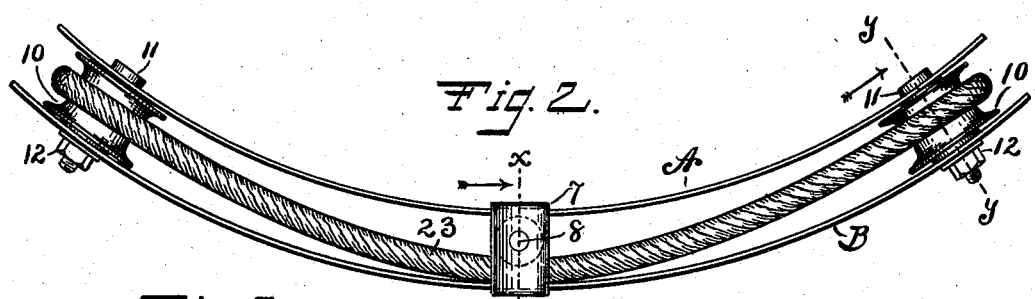
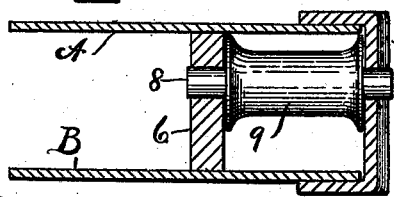
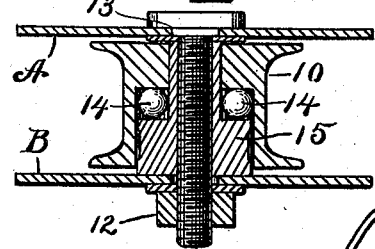
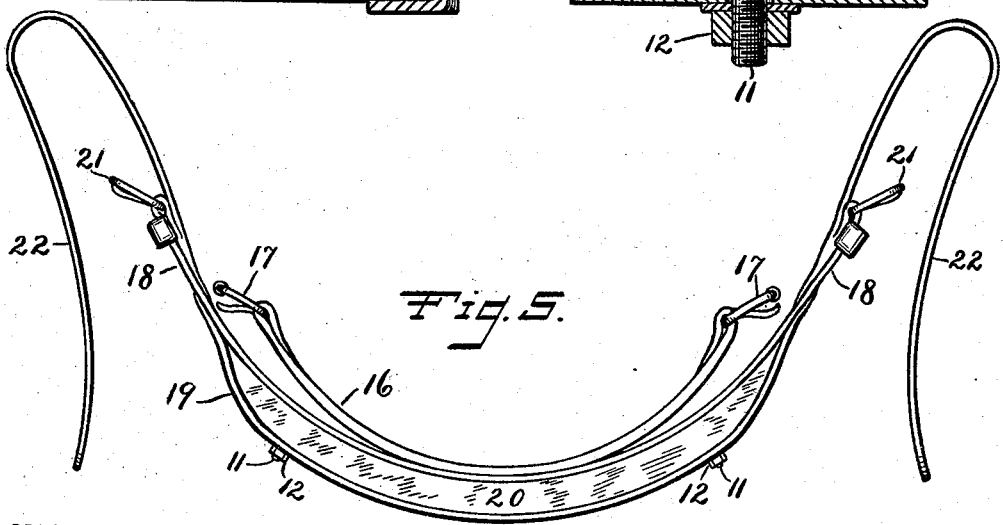
Witnesses.
Inventor.
Eugene A. Hyde.
By James Shepard
Atty.

UNITED STATES PATENT OFFICE.

EUGENE A. HYDE, OF NEW BRITAIN, CONNECTICUT.

GAITING DEVICE FOR HORSES.

No. 873,240.     Specification of Letters Patent.     Patented Dec. 10, 1907.

Application filed January 22, 1907. Serial No. 353,546.

*To all whom it may concern:*

Be it known that I, EUGENE A. HYDE, a citizen of the United States, residing at New Britain, in the county of Hartford and State of Connecticut, have invented certain new and useful Improvements in a Gaiting Device for Horses, of which the following is a specification.

My invention relates to gaiting devices for horses, and the objects of my improvements are simplicity and economy in construction and convenience and efficiency in use, with particular reference to compelling the horse to travel "wide or open gaited" with its hind legs; reference to preventing the horse from "interfering", "scalping", "overreaching", and "hitching"; and reference to compelling the horse to trot or pace "square".

In the accompanying drawing:—Figure 1 is a plan view of the metal frame and attached pulleys of my gaiting device, together with a portion of the rope that is used in connection therewith. Fig. 2 is a front elevation of the same. Fig. 3 is a transverse section of the same on the line x x of Fig. 2, with the roller and its trunnions or pin in elevation. Fig. 4 is a transverse section of the said frame on the line y y of Fig. 2, the bolt and balls for the pulley being in elevation. Fig. 5 is a front elevation of the complete device ready to be applied to a harness and horse.

The plates A, and B, are thin plates of any suitable stiffness, suitably spaced and held together at their middle by means of the connecting and spacing piece 6 and the tie 7 to which the said plates are secured in any proper manner, as for example by rivets or screws. The said piece 6 and tie 7 are perforated so as to form suitable bearings for the pin or axle 8 of the roller 9, the said roller being set closer to the upper plate A than it is to lower plate B so as to leave a rope space underneath the roller 9. Between the two plates near their ends, I secure the pulleys 10 which are adjustably mounted by means of the bolt or axle 11 and nut 12 in slots 13 of the plates, so that the distance between the two pulleys may be varied at pleasure by loosening the nuts 12 and moving the pulleys to or from each other, the bolts slipping along in the said slots. The end pulleys and bolts serve to properly space and hold the plates at each end. The plates A, B, are curved from end to end as best shown in Fig. 2, on a curve of a little greater radius than a belly band would have when buckled under an ordinary sized horse. The plates are preferably of about the same distance apart from end to end although it is only necessary that there shall be suitable pulley and rope space between them. I also prefer to form a series of perforations in the edges of the plates A, B, for convenience of covering the said parts with leather.

The particular construction of the roller and pulleys and manner of mounting them between the plates A, and B, is not essential to my invention, although it is very desirable and practically essential that some means shall be provided for adjusting the end pulleys to and from each other on the plates A, B. Such adjustment is provided for by the slotted plates and bolts. I prefer to provide the end pulleys with anti-friction balls 14, running in a suitable race formed by the recessed pulley 10 and a collar or sleeve 15 on the bolt 11, as shown in Fig. 4.

The metal parts hereinbefore described are secured in any suitable manner to the middle portion of any ordinary belly band 16, having the usual buckles 17 or equivalent fastening devices for connecting it with the straps that depend from the harness saddle. These metal parts are so secured to the said band 16 that a line from pulley to pulley extends longitudinally to the said band. It is preferable to cover the metal plates A, B, with leather, and this may be done by means of a top strap 18 on the concave side of the upper plate A and a bottom strap 19 under the lower plate B, both straps being longer than the plates A, B, and sewed or riveted together where they project beyond the ends of the said plates. A filling piece 20 of leather may be sewed in between the top and bottom straps to cover the edges of the metal as shown for the front edge in Fig. 5, although it is necessary to leave rope spaces at the rear edge which may readily be provided by cutting away portions of the leather filling piece. The belly band may be properly secured to the other parts by sewing or riveting it to the middle portion of the top strap 18 on the concave side of the frame. The metal parts together with the straps by which they are covered are in the nature of a second belly band or the lower member of a double band and are provided with buckles 21 and shaft straps 22 to secure the same to the shafts or thills in the ordinary manner of securing a second or double belly band thereto. This construction enables the gaiting device to be connected with the horse and shafts by merely substituting it for the usual double belly band of an ordinary harness and hitching up the horse in the ordinary manner.

A rope or strap 23 has its middle portion around the front of the pulleys 10 and under the roller 9, with its ends extending to the rear, which ends by means of suitable straps or devices not shown may be connected with the respective hind legs of a horse above the hocks, whereby the right leg must necessarily move forward as the left leg moves backward and vice versa. By adjusting the pulleys 10 in the frame and securing them at a greater or less distance from each other, the travel of the horse may be regulated as may be desired.

By my improvement the device is mounted in the rear of the horse's fore legs with the pulleys spread laterally to accommodate the spread of the horse's hind legs. The device is simple in construction and can be applied to an ordinary harness for hitching up the horse in the usual manner and when applied is not strikingly noticeable or unsightly. By having the laterally spread pulleys in the rear of the horse's fore legs, the pulleys may be set nearer together or farther apart as may be desired, to vary the spread of the horse's hind legs. All of the functions or results in regulating the speed of horses that may be attained by connecting the horse's hind legs by a rope passing around pulleys, can be attained by my gaiting device.

I claim as my invention:—

1. In a gaiting device for horses, the combination of a harness belly band having fastening devices, one at each end, for connecting the said band with the straps that depend from a harness saddle, with a pulley frame secured by its middle portion to the middle portion of the said belly band, and two pulleys mounted on the said frame with one of the said pulleys at or near each of the respective ends of the said frame and in a line that extends longitudinally to the said band.

2. In gaiting devices for horses, a pulley frame, pulleys at each end of the said frame, means for adjusting the said pulleys to and from each other and a harness belly band secured by its middle portion to the middle portion of the said pulley frame.

3. In gaiting devices for horses, a pulley frame carrying pulleys at or near each end, the said frame being curved from end to end, a harness belly band secured by its middle portion to the concave side of the said pulley frame, and shaft straps extending from the ends of the said pulley frame to convert the said frame into the lower part of a double belly band.

4. In gaiting devices for horses, a pulley frame having curved plates and middle connecting pieces, a middle roller with rope space underneath, and a pulley and pulley support at each end of the said plates.

5. In gaiting devices for horses, curved plates secured together to constitute a pulley frame, the said plates being slotted at each end, pulleys and pulley axles adjustably mounted in the slotted ends of the said plates.

EUGENE A. HYDE.

Witnesses:
JAMES SHEPARD,
SHEFFIELD H. CLARKE.